United States Patent
Kato et al.

(10) Patent No.: US 8,654,429 B2
(45) Date of Patent: Feb. 18, 2014

(54) LIGHT AMOUNT ADJUSTMENT APPARATUS AND OPTICAL APPARATUS

(75) Inventors: Susumu Kato, Kawagoe (JP); Osamu Sato, Hiki-gun (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 24 days.

(21) Appl. No.: 13/329,692

(22) Filed: Dec. 19, 2011

(65) Prior Publication Data
US 2012/0154888 A1    Jun. 21, 2012

(30) Foreign Application Priority Data

Dec. 21, 2010 (JP) .................................. 2010-284308
Dec. 15, 2011 (JP) .................................. 2011-274625

(51) Int. Cl.
*G02B 26/02* (2006.01)

(52) U.S. Cl.
USPC .......................................................... 359/234

(58) Field of Classification Search
USPC .......... 359/227, 233, 234, 236, 510; 396/461, 396/493, 495–497
See application file for complete search history.

(56) References Cited

U.S. PATENT DOCUMENTS

2008/0192326 A1*    8/2008    Mizumaki et al. ............ 359/234

FOREIGN PATENT DOCUMENTS

JP          02-114246 A          4/1990

* cited by examiner

*Primary Examiner* — Euncha Cherry
(74) *Attorney, Agent, or Firm* — Fitzpatrick, Cella, Harper & Scinto

(57) ABSTRACT

The light-amount-adjustment apparatus includes a base member formed with cam-groove portions, and light-blocking blades forming a variable light-passing aperture and each of which is provided with a driving pin and a cam pin, the cam pin engaging one of the cam-groove portions. The apparatus also includes a driving ring disposed on a side of the blades opposite from the base member and rotating with respect to the base member to transmit a driving force to the driving pins so as to rotate the light-blocking blades. A base-member side face of each light-blocking blade is supported by the base member. The driving ring is formed with first blade-supporting portions protruding from a ring-shaped portion outward in a radial direction and including a driving-hole portion with which the driving pin engages. Each first blade-supporting portion supports an opposite-side blade face opposite to the base-member side blade face of a light-blocking blade.

12 Claims, 11 Drawing Sheets

PRIOR ART

PRIOR ART

140 # LIGHT AMOUNT ADJUSTMENT APPARATUS AND OPTICAL APPARATUS

BACKGROUND OF THE INVENTION

The present invention relates to a light-amount-adjustment apparatus, a so-called aperture-stop apparatus or the like, to be used in optical apparatuses such as cameras and interchangeable lenses.

Such light-amount-adjustment apparatuses are required to operate with high speed and smoothness. Japanese Patent Laid-Open No. 2-114246 discloses a conventional light-amount-adjustment apparatus (aperture-stop apparatus) shown in FIGS. 12 to 14, which rotates a driving ring around a fixed aperture to rotate plural stop blades as light-blocking blades in open and close directions and thereby changes the size (diameter) of a variable aperture formed by the plural stop blades to adjust the amount of light. This aperture-stop apparatus is also called an iris-aperture-stop apparatus.

As shown in FIGS. 12 and 13, each of the stop blades 210 is provided with a driving pin 211 and a cam pin 212 that protrude from a blade face in opposite directions from each other. The driving ring 220 shown in FIGS. 12 and 14 is formed with plural driving-hole portions 223 with which the driving pins 211 of the stop blades 210 respectively engage.

A base plate 250 shown in FIG. 12 is provided with the fixed aperture 254 that is formed in its central part and plural cam-groove portions 251 that are formed around the fixed aperture 254 and with which the cam pins 212 of the stop blades 210 respectively engage. A retainer plate 240 is disposed so as to sandwich the stop blades 210 and the driving ring 220 with the base plate 250, and is fixed to the base plate 250.

Thus, in the conventional aperture-stop apparatus, the stop blades 210 are rotatably supported in a sandwiched manner between the fixed base plate 250 and the rotatable driving ring 220. Specifically, as shown in FIG. 15, a driving-ring-side blade face, which is an opposite-side blade face to a base-plate-side blade face, of each stop blade 210 is supported by the driving ring 220 shown as a hatched member. On the other hand, of the base-plate-side blade face of each stop blade 210, a reverse portion to the driving pin 211 is supported by the base plate 250.

In addition, of the base-plate-side blade face of each stop blade 210, an area around a reverse portion to the cam pins 212 is supported by blade-supporting portions 228 formed in the driving ring 220 so as to extend outward in a radial direction of the driving ring 220. The blade-supporting portion 228 is provided in the driving ring 220 at plural circumferential places near the driving-hole portions 223. As shown in FIG. 14, a connection portion 211 is formed in circumferential interval portions between the blade-supporting portions 228 so as to circumferentially extend to form a single continuous flange with the blade-supporting portions 228. Base-plate-side faces (that is, stop-blade-side faces) of the blade-supporting portions 228 and the connection portion 221 are formed so as to form a single plane (flange plane).

Moreover, on an inner circumferential side of the driving ring 220, a radial supporting portion 226 is formed so as to have a cylindrical shape and protrude toward the retainer plate 240. At plural circumferential places on an outer circumferential face of the radial supporting portion 226, protrusions 227 are formed, each of which makes contact with an inner circumferential face of the retainer plate 240 so as to allow rotation of the driving ring 220.

As described above, in the conventional aperture-stop apparatus, the opposite-side blade face to the base-plate-side blade face of the stop blade 210 is supported by the driving ring 220 that is a rotatable member, which forms a configuration that causes the rotating stop blade 210 and the rotating driving ring 220 to slide with respect to each other. Such a configuration may increase frictional resistance between the stop blade 210 and the driving ring 220, depending on the relationship of rotational directions of the driving ring 220 and the stop blade 210, which makes it difficult to rotate the stop blade 210 smoothly.

Moreover, of the base-plate-side blade face of the stop blade 210, the area around the reverse portion to the cam pin 212 is supported by the blade-supporting portion 228 of the driving ring 220. However, of the base-plate-side blade face, the reverse portion to the cam pin 212 is not supported, which may cause disengagement of the cam pin 212 from the cam-groove portion 251.

Furthermore, of the driving-ring-side blade face of each of the stop blades 210, an area around the driving pin 211 is supported by the flange plane as a single plane of the driving ring 220. However, such a supporting configuration requires an extremely high flatness of the flange plane in order to reliably support all the stop blades 210. A low flatness of the flange plane may cause fluttering of the stop blades 210 or interference between the stop blades 210 adjacent to each other.

In addition thereto, the single continuous flange formed by the plural blade-supporting portions 228 and the connection portion 221 in the driving ring 220 increases rotational inertia of the driving ring 220, which makes it difficult to drive the aperture-stop apparatus with high speed.

Moreover, the single continuous flange increases radial-directional rigidity of the driving ring 220, which may, if the accuracy of the gaps between the protrusions 227 formed in the radial supporting portions 226 of the driving ring 220 and the inner circumferential face of the retainer plate 240 is significantly high, increase the frictional resistance therebetween or cause excessive radial backlash of the driving ring 220 to cause a deterioration of the control accuracy of the open and close positions of the stop blades 210 (that is, control accuracy of the aperture diameter).

BRIEF SUMMARY OF THE INVENTION

The present invention provides a light-amount-adjustment apparatus capable of operating smoothly and controlling the aperture diameter accurately, and furthermore is capable of operating with high speed. The present invention also provides an optical apparatus with the light-amount-adjustment apparatus.

The present invention provides as one aspect thereof a light-amount-adjustment apparatus including a base member formed with a fixed aperture through which light passes and plural cam-groove portions, plural light-blocking blades arranged in a circumferential direction of the fixed aperture and forming a variable aperture through which the light passes, each light-blocking blade being provided with a driving pin and a cam pin engaging with each cam-groove portion, a driving ring disposed on an opposite side from a base-member side of the light-blocking blades and rotating in the circumferential direction of the fixed aperture with respect to the base member to transmit a driving force to the driving pins so as to rotate the light-blocking blades for changing the size of the variable aperture, and a driving-source part rotationally driving the driving ring. A base-member-side blade face of each light-blocking blade is supported by the base member, and the driving ring is provided with (a) a ring-shaped portion and (b) first blade-supporting portions each formed so as to protrude from the ring-shaped portion outward in a radial direction thereof and each formed with a driving-hole portion with which the driving pin engages. Each first blade-supporting portion supports an opposite-side blade face opposite from the base-member-side blade face of each light-blocking blade.

The present invention provides as another aspect thereof an optical apparatus provided with the above-described light-amount-adjustment apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

[Embodiment 1]

Figure 1:
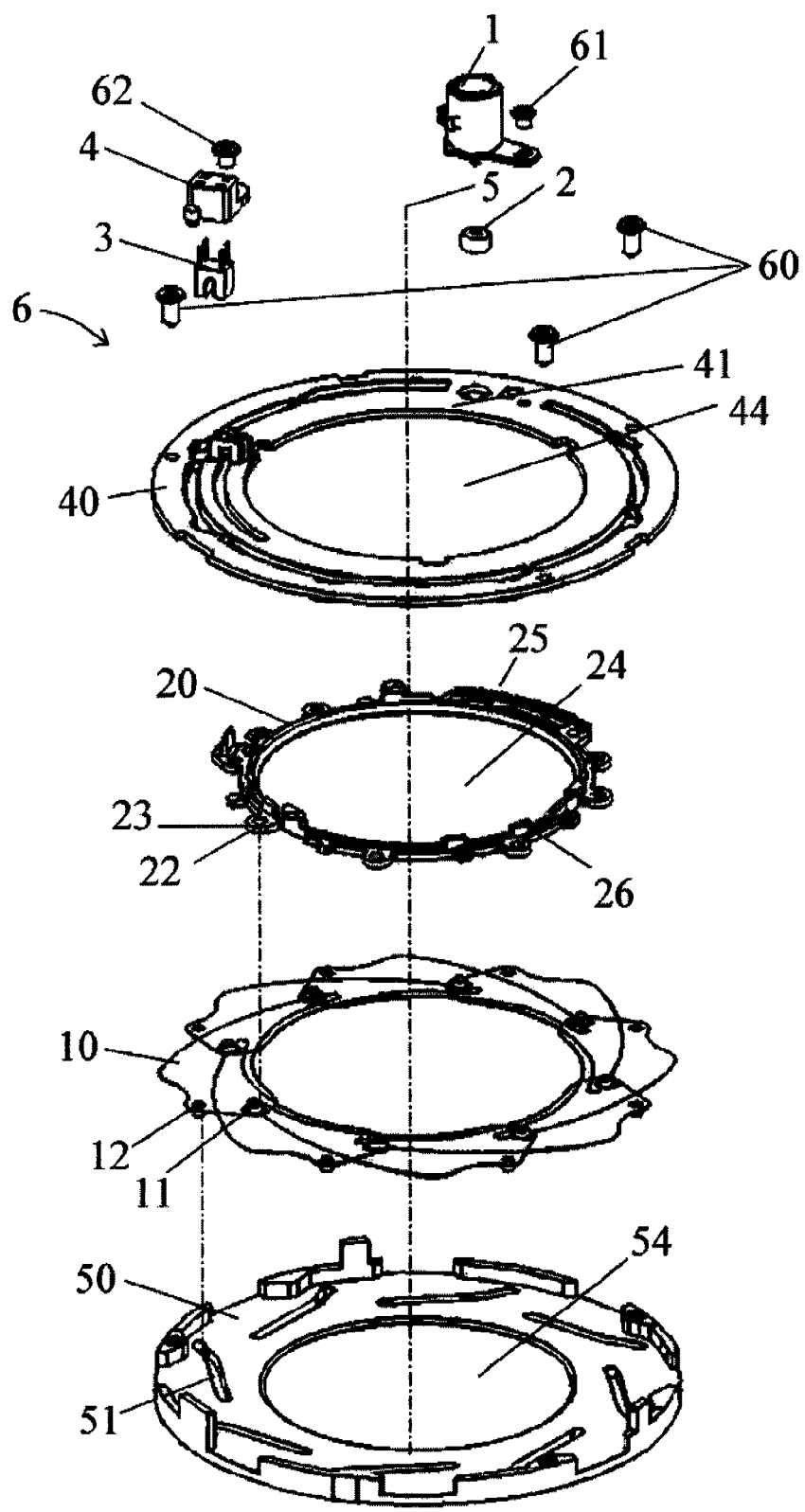
FIG. 1 is an exploded perspective view of an aperture-stop apparatus that is Embodiment 1 of the present invention.
Figure 7:
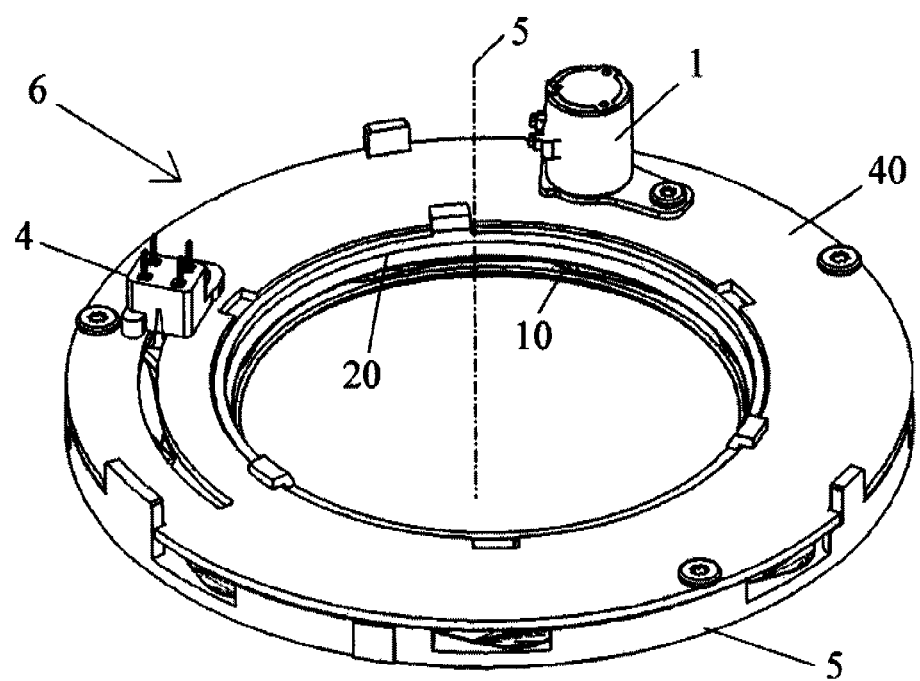
FIG. 7 is a perspective view of the aperture-stop apparatus of Embodiment 1.

FIG. 1 is an exploded perspective view of an iris-aperture-stop apparatus 6 as a light-amount-adjustment apparatus that is a first embodiment (Embodiment 1) of the present invention. FIG. 7 is a perspective view of the assembled iris-aperture-stop apparatus 6. Although a description will hereinafter be provided of the light-amount-adjustment apparatus as an aperture-stop apparatus, alternative embodiments of the present invention include other light-amount-adjustment apparatuses, such as a shutter and an aperture-stop apparatus with a shutter function.

The aperture-stop apparatus 6 includes an actuator 1, a retainer plate (retaining member) 40, a driving ring 20, plural stop blades (light-blocking blades) 10, a base plate (base member) 50 and a photo interrupter 3.

The actuator 1 is an electromagnetic actuator, such as a stepping motor. An output shaft of the actuator 1 is provided with a pinion gear 2 that rotates the driving ring 20. The actuator 1 and the pinion gear 2 constitute a driving-source part.

The photo interrupter 3 is used as a sensor to detect an initial position of the driving ring 20. A sensor-holding member 4 holds the photo interrupter 3. The actuator 1 and the sensor-holding member 4 holding the photo interrupter 3 are attached to the retainer plate 40 with a screw 61 and a screw 62, respectively.

Reference numeral 5 denotes a central axis of the aperture-stop apparatus, which coincides with an optical axis of an image pickup apparatus provided with the aperture-stop apparatus. A direction parallel to the central axis 5 is hereinafter referred to as "a thrust direction". The retainer plate 40, the driving ring 20, the stop blades 10, and the base plate 50 are arranged (stacked) in the thrust direction in this order. That is, the driving ring 20 is disposed on an opposite side of the stop blades 10 from the base plate 50. The retainer plate 40 is disposed on the opposite side of the stop blades 10 and the driving ring 20 from the base plate 50. A direction and a plane that are orthogonal to the thrust direction are hereinafter respectively referred to as "a radial direction" and "a radial plane".

The plural stop blades 10 are arranged in a circumferential direction of a fixed aperture 54 formed in the base plate 50. Although eight stop blades 10 are used in this embodiment, the number of the stop blades 10 is not limited to eight, and may be another plural number.

Figure 4:
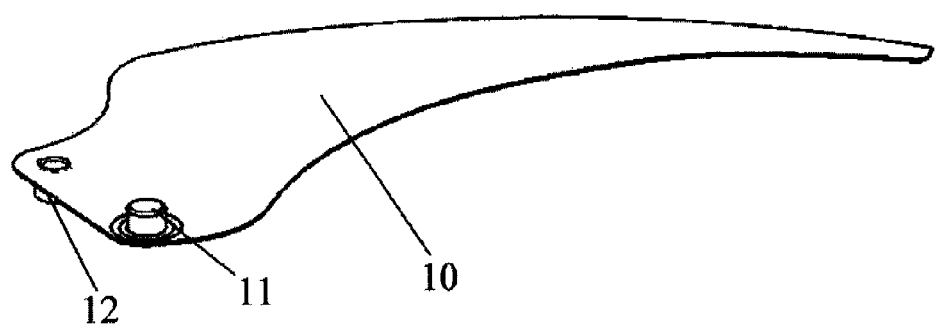
FIG. 4 is a perspective view of a stop blade in the aperture-stop apparatus of Embodiment 1.

FIG. 4 is an enlarged view of one of the stop blades 10. The stop blade 10 includes a flat plane-shaped blade portion having a light-blocking function and being disposed approximately parallel to the radial plane. The stop blade 10 also includes a driving pin 11 and a cam pin 12 that are formed so as to protrude from mutually opposite sides in the thrust direction from the blade portion. The driving pin 11 and the cam pin 12 are located at different positions from each other in the radial plane.

Figure 2:
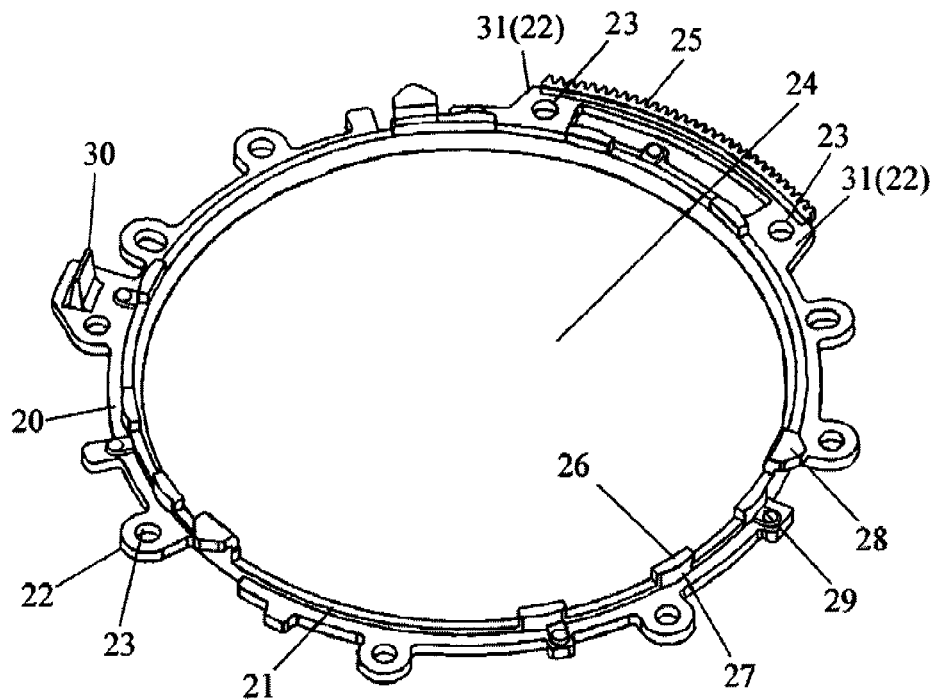
FIG. 2 is a perspective view of a driving ring in the aperture-stop apparatus of Embodiment 1.

FIG. 2 is an enlarged view of the driving ring 20. The driving ring 20 includes a light-passing aperture 24 formed in its central part, blade-supporting protrusion portions 22 as first blade-supporting portions formed at plural circumferential places (eight places) around the light-passing aperture 24 and a connection portion (ring-shaped portion) 21 formed so as to have a ring shape and circumferentially connecting the eight blade-supporting protrusion portions 22. Each blade-supporting protrusion portion 22 is formed so as to protrude outward in the radial direction from the connection portion 21. The eight blade-supporting protrusion portions 22 are formed with driving-hole portions 23 into which the driving pins 11 of the eight stop blades 10 are inserted to engage therewith.

A partial area of an outer circumferential part of the driving ring 20 is formed with a gear portion 25 with which a pinion gear 2 engages. The gear portion 25 includes a gear-teeth portion that circumferentially extends so as to have a circular arc shape and in which plural gear teeth are formed in its outer circumferential part. The gear portion 25 further includes two gear-support portions 31 extending outward in the radial direction from the connection portion 21 to the gear-teeth portion so as to form a space between the gear-teeth portion and the connection portion 21. Each of the gear-support portions 31 is formed with a driving-hole portion 23 into which the driving pin 11 of one of the stop blades 10 is inserted to engage therewith. In other words, the two gear-support portions 31 also serve as two of the eight blade-supporting protrusion portions 22.

The connection portion 21 of the driving ring is formed with radial supporting-wall portions (rotation supporting portions) 26, each extending toward the retainer plate 40 in the thrust direction from the connection portion 21 at plural circumferential places (eight places in this embodiment). Reference numeral 27 denotes contacting-protrusion portions, each formed as a convex face on an outer circumferential face of each of the radial supporting-wall portions 26. Contact of the contacting-protrusion portions 27 of the radial supporting-wall portions 26 to an inner circumferential face of the retainer plate 40 engages the driving ring 20 with the inner circumferential face of the retainer plate 40, thereby supporting the driving ring 20 rotatably about the central axis 5.

In addition, a retainer-plate-side part of the connection portion 21 of the driving ring 20 is provided with thrust hooks 28 formed at plural circumferential places (three places in this embodiment), and a base-plate-side part (stop blade side part) of the connection portion 21 is provided with thrust-retaining protrusions 29 formed at plural circumferential places (six places in this embodiment). The thrust hooks 28 and the thrust-retaining protrusions 29 sandwich an inner circumferential portion (driving-ring supporting portion) 41 of the retainer plate 40 in the thrust direction, thereby enabling the retainer plate 40 to support the rotatable driving ring 20 in the thrust direction.

The driving ring 20 is provided with a light-blocking protrusion portion 30 at one circumferential place. The light-blocking protrusion portion 30 enters between a light-emitting portion and a light-receiving portion of the photo interrupter 3 to block light emitted from the light-emitting portion from reaching the light-receiving portion.

As shown in FIG. 1, the retainer plate 40 is disposed so as to cover (retain) the stop blades 10 and the driving ring 20 placed between the retainer plate 40 and the base plate 50, and fixed to the base plate 50 with three screws 60.

Figure 3:
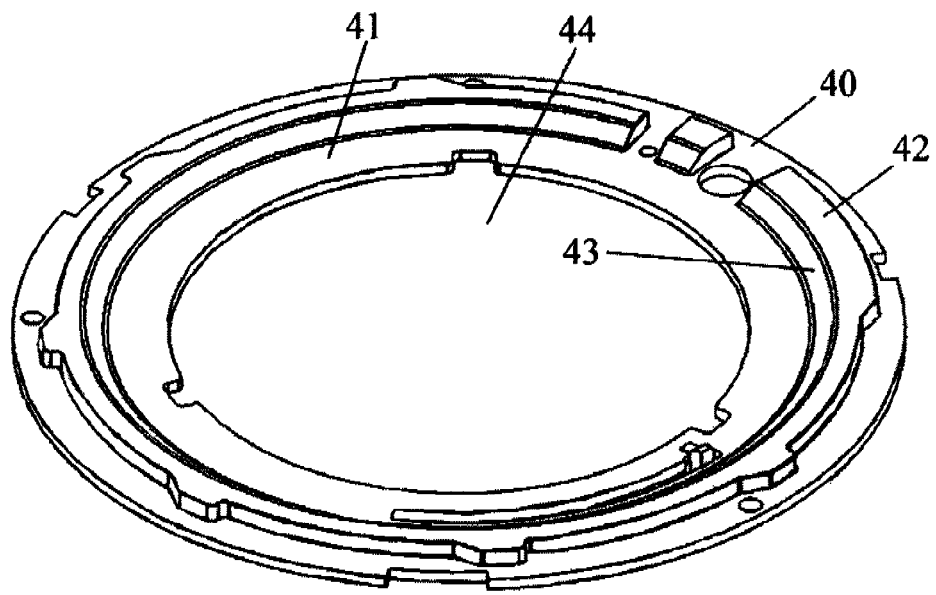
FIG. 3 is a perspective view of a retainer plate in the aperture-stop apparatus of Embodiment 1.

FIG. 3 is an enlarged view of the retainer plate 40. The retainer plate 40 is formed to have a ring shape in which a light-passing aperture 44 is formed in its central part. The retainer plate 40 is provided with a supporting rail 42 as a second blade-supporting part formed at a further outside area than the driving-ring supporting portion 41, the supporting rail 42 protruding toward the stop blades 10 to retain (support) a reverse portion to the cam pin 12 of the blade portion (blade face) of each stop blade 10.

In this embodiment, the term "to support (or retain)" means to restrict excessive motion of the stop blade 10 such that the stop blades do not flutter or drop off while providing a gap necessary for smooth rotation of the stop blades 10. In other wards, the term "to support" does not mean to hold such that no gap exists in a direction (thrust direction) other than the rotation direction of the stop blade 10.

An inner circumferential part (driving-ring-part part) of the supporting rail 42 is formed as a slope face 43. The slope face 43 is provided to gradually change (increase) a protruding amount of the supporting rail 42 in the thrust direction, from the driving-ring side (that is, from an inner part) toward a rail face of the side supporting rail 42 (that is, toward an outer part). Such a slope face 43 prevents the stop blades 10 from being caught by the supporting rail 42 to enable smooth rotation of the stop blades 10.

The base plate 50 is formed to have a ring shape in which a light-passing aperture 54 as a fixed aperture is formed in its central part. A ring-shaped part of the base plate 50 is formed with plural cam-groove portions with which the cam pins 12 of the plural stop blades 10 respectively engage (eight cam-groove portions in this embodiment, the number of which is the same as that of the stop blades 10).

In the aperture-stop apparatus 6 thus configured, the actuator 1 rotates, via the pinion gear 2, the driving ring 20 about the central axis 5 (that is, in the circumferential direction) with respect to the base plate 50 and the retainer plate 40. The driving ring 20 transmits a driving force from the actuator 1 to the eight stop blades 10 through the driving pins 11 thereof. Specifically, the driving-hole portions 23 of the driving ring 20 engage the driving pins 11 to rotate the stop blades 10 when the driving ring is rotated, pushing the cam pin 12 of each stop blade 10 while moving the cam pin 12 along the cam-groove portion 51, and thereby each stop blade 10 is rotated about its driving pin 11. Controlling the rotational position of the driving ring 20 through control of the actuator 1 enables control of the rotational position of each stop blade 10, that is, the size (diameter) of a stop aperture (variable aperture) formed by the stop blades 10. Changing the diameter of the stop aperture enables a change (adjustment) of the amount of light passing through the light-passing apertures 44, 24 and 54.

An initial position of the driving ring 20 necessary for controlling the rotational position thereof is detected by detecting a signal showing that the light-blocking protrusion portion 30 of the driving ring 20 enters between the light-emitting portion and the light-receiving portion of the photo interrupter 3 and thereby the light emitted from the light-emitting portion is blocked.

Figure 5:
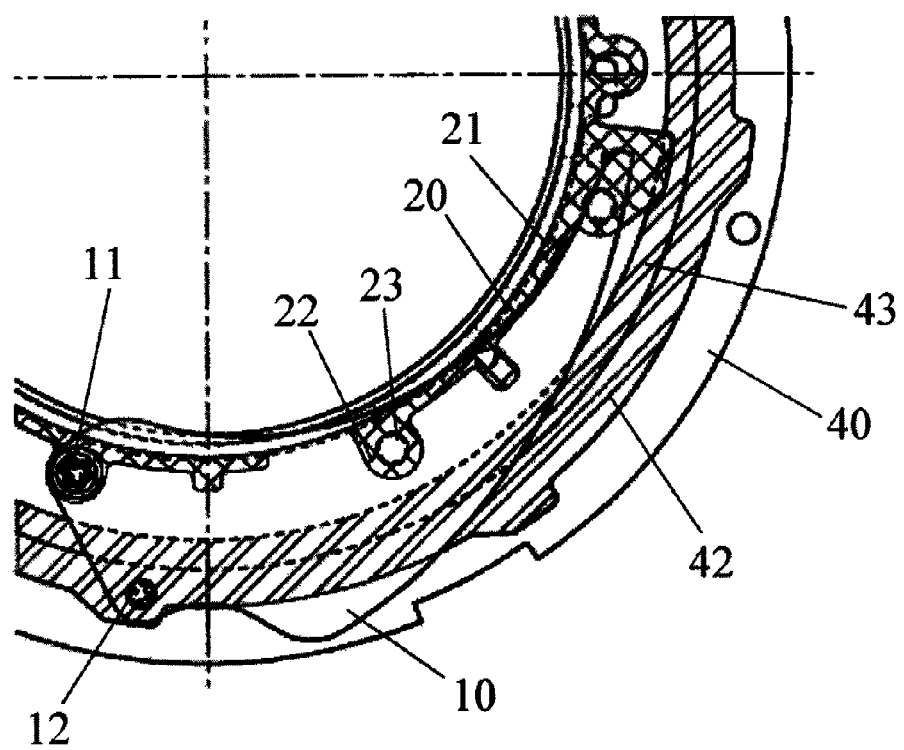
FIG. 5 is a transparent view showing a relationship among the stop blade, the retainer plate and the base plate in Embodiment 1.
Figure 6A:
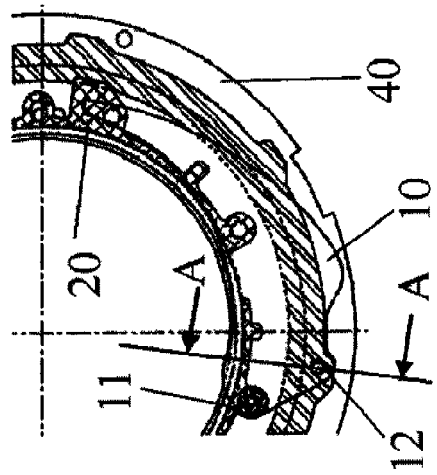
FIG. 6A is a cross-sectional view of the aperture-stop apparatus of Embodiment 1.
Figure 6A:
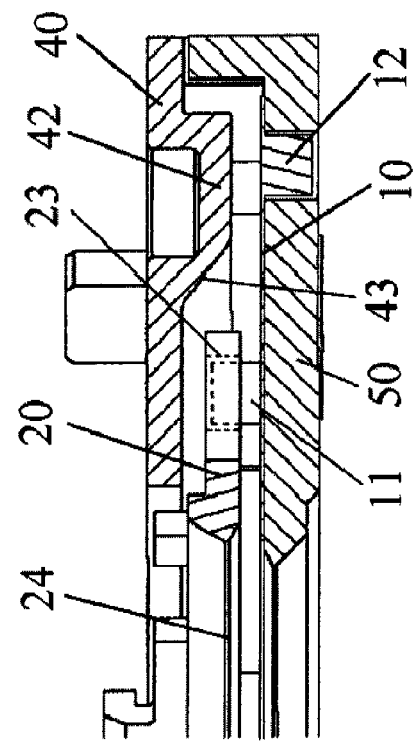

In the aperture-stop apparatus 6 of this embodiment, each stop blade 10 rotates while being in contact with the rotating driving ring 20. However, as shown by a hatched part in FIG. 5, each stop blade 10 is in contact with only the blade-supporting protrusion portion 22 of the driving ring 20, and thus the contact area therebetween is small. Such a small contact area is achieved by, as understood from a cross-sectional view of FIG. 6A, a configuration in which a retainer-plate-side blade face of the stop blade 10 is supported, not by only the driving ring 220 as in the conventional aperture-stop apparatus shown in FIGS. 15 and 16, but by the blade-supporting protrusion portion 22 of the driving ring 20 and the supporting rail 42 of the retainer plate 40. Moreover, the retainer plate 40 is not a rotatable member like the driving ring 20, but a fixed member. On the other hand, the base-plate-side blade face of the stop blade 10 is supported by, as well as the conventional aperture-stop apparatus, the base plate 50 that is a fixed member.

Therefore, as compared with the conventional aperture-stop apparatus that supports the stop blades 210 by bringing the driving ring 220 in contact therewith a large contact area, the aperture-stop apparatus 6 of this embodiment can reduce the frictional resistance that the stop blades 10 receive from the driving ring 20. Thus, the stop blades 10 can operate smoothly, which makes it possible to improve control accuracy of the aperture diameter.

Moreover, providing to the retainer plate 40 the supporting rail 42 that supports the reverse portion to the cam pin 12 of the blade portion of each stop blade 10 makes it possible to prevent disengagement of the cam pin 12 from the cam-groove portion 51. In addition, forming the slope face 43 on the supporting rail 42 makes it possible to prevent the stop blade 10 rotating from the driving-ring side toward the rail face of the supporting rail 42 from being caught by the supporting rail 42, which secures smooth rotation of the stop blade 10.

Moreover, causing the driving ring 20 and the retainer plate 40 (supporting rail 42) to respectively support different parts of the stop blade 10 makes it possible to reduce the diameter and the weight of the driving ring 20, as compared with the conventional aperture-stop apparatus in which the driving ring 220, having the role of singly supporting the stop blades 210, is large in diameter. Therefore, it is possible to reduce the frictional resistance between the driving ring 20 and the retainer plate 40, which enables smooth rotation of the driving ring 20. In addition, the reduction of the diameter and weight of the driving ring 20 reduces the rotation inertia thereof. This enables the aperture-stop apparatus 6 to quickly repeat the rotation and stoppage of the driving ring 20 and to quickly switch the rotational direction of the driving ring 20, which can improve quick responsiveness of the aperture-stop apparatus 6.

Furthermore, the driving ring 20 includes the ring-shaped connection portion 21 and the plural blade-supporting protrusion portions 22, each radially protruding outward with respect to the connection portion 21 and each formed with the driving-hole portion 23. Each blade-supporting protrusion portion supports only a part near the driving pin 11 (hereinafter referred to as "a driving-pin base part") of the blade portion of the stop blade 10, the driving pin 11 being a rotation center of the stop blade 10. Thus, it is possible to further reduce the contact area between the driving ring 20 and the stop blade 10, which enables a reduction of the frictional resistance generated therebetween and thereby enables smoother rotation of the stop blade 10. In addition, the blade-supporting protrusion portion 22 reliably supports the driving-pin base part of the blade portion of the stop blade 10, which makes it possible to suppress fluttering of the stop blade 10 and thereby makes it possible to secure smooth rotation of the stop blade 10.

Moreover, forming the radial supporting-wall portions 26, each of which protrudes in the thrust direction from the connection portion 21 and has the contact protrusion 27 making rotatable contact with (or rotatably engaging with) the retainer plate 40 in the radial direction, at the plural circumferential places in the driving ring 20 can reduce the weight of the driving ring 20, thereby enabling a reduction of the rotation inertia thereof, as compared with a case of forming such a radial supporting-wall portion over the entire circumference of the driving ring 20.

Moreover, the radial supporting-wall portions having some elasticity in the radial direction secure moderate engagement with the retainer plate 40 even when the radial supporting-wall portions 26 and the retainer plate 40 have almost no engagement backlash therebetween, which makes it possible to allow smooth rotation of the driving ring 20 while suppressing backlash of the driving ring 20 with respect to the retainer plate 40. An excessive engagement backlash of the driving ring 20 with respect to the retainer plate 40 causes position variation of the stop blade 10 in response to a change of position of the aperture-stop apparatus 6 (that is, position of an image pickup apparatus provided with the aperture-stop apparatus 6), which causes light-amount-adjustment errors. However, this embodiment can reduce such light-amount-adjustment errors in response to the positional change.

Moreover, in the gear portion 25 of the driving ring 20, forming the gear-teeth portion and the gear-support portions 31 supporting the gear-teeth portion separated by a distance away from the connection portion 21 makes it possible to secure a high mechanical strength while providing elasticity to the gear portion 25. This enables prevention of unsmooth gear engagement associated with displacement of the output shaft of the actuator 1 generated when the driving force of the actuator 1 is transmitted from the pinion gear 2 to the gear portion 25, which enables smooth rotational drive of the driving ring 20.

Although this embodiment has described the case where the driving ring 20 is supported by the retainer plate 40 in the thrust direction, the driving ring 20 may be supported by being sandwiched between the retainer plate 40 and the base plate 50.

Moreover, although this embodiment has described the case of providing the retainer plate 40, such a retainer plate may be omitted when stop blades (light-blocking blades) can be well supported only by a base member and a driving ring.

Figure 6B:
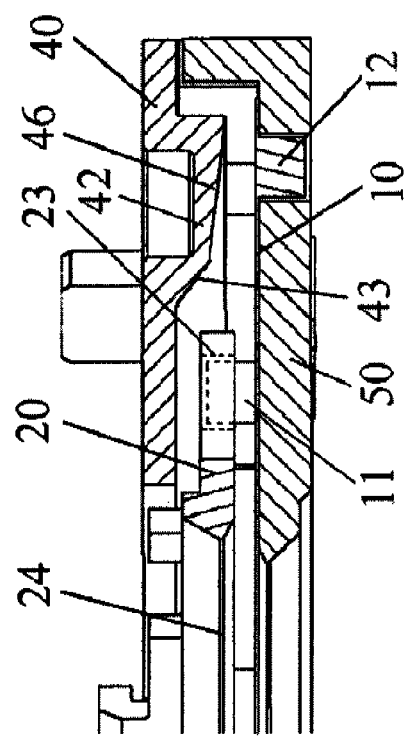
FIG. 6B is a cross-sectional view of a modified example of the aperture-stop apparatus of Embodiment 1.

In addition, as shown in FIG. 6B, the rail face (blade side face) of the supporting rail 42 facing the blade face of the stop blade 10 may be formed as a slope face 46. The slope face 46 is formed so as to gradually approach the blade face of the stop blade 10 from inside to outside of the supporting rail (rail face) 42 in the radial direction (in other words, such that the protruding amount of the supporting rail 42 in the thrust direction gradually increases). The slope face 46 is connected to the slope face 43 with a smoothly curved face, which prevents the stop blade 10 from being caught by the supporting rail 42 to enable smooth rotation of the stop blade 10.

[Embodiment 2]

Figure 8:
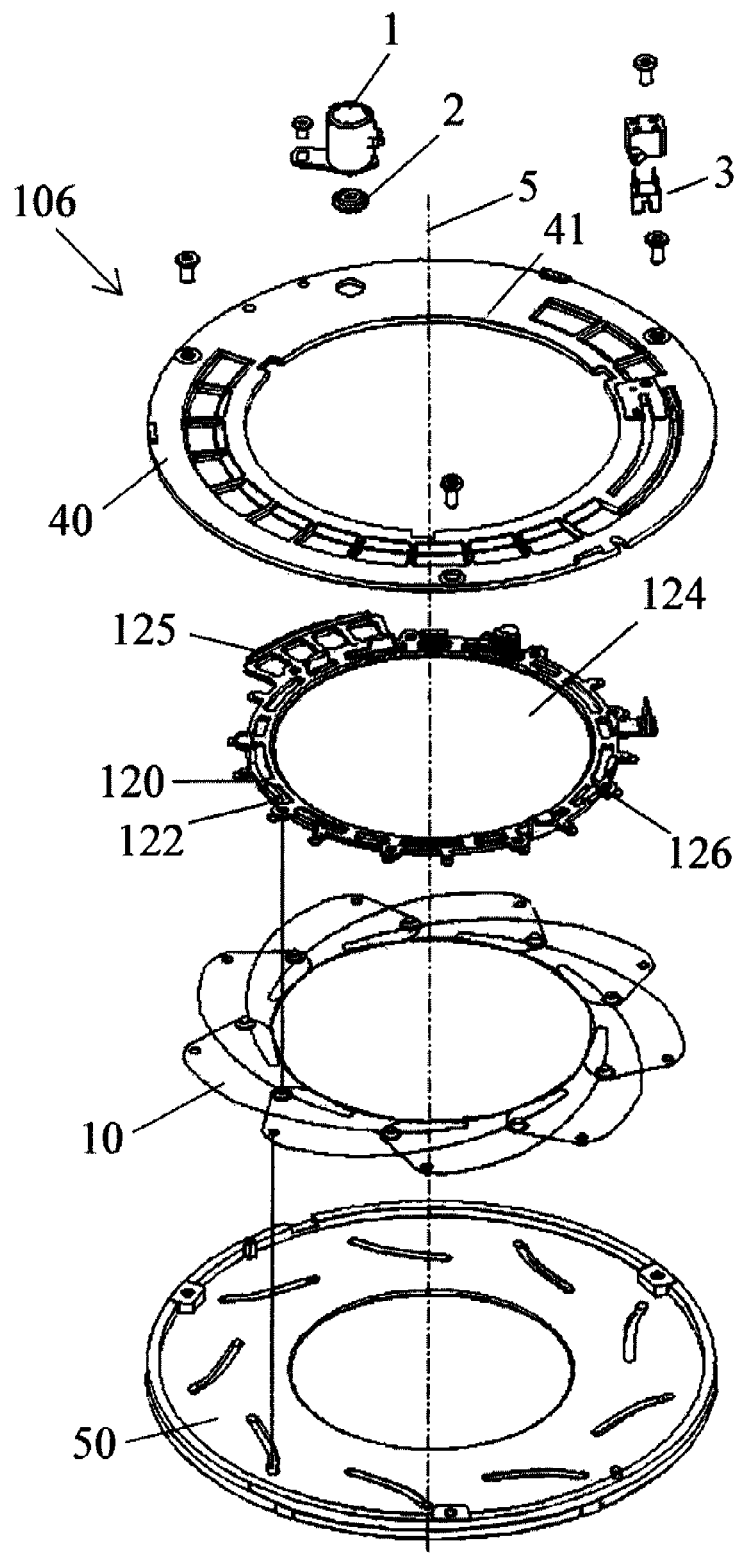
FIG. 8 is an exploded perspective view of an aperture-stop apparatus that is Embodiment 2 of the present invention.

FIG. 8 is an exploded perspective view of an iris-aperture-stop apparatus 106 that is a second embodiment (Embodiment 2) of the present invention. The configuration of the aperture-stop apparatus 106 of Embodiment 2 is different from the aperture-stop apparatus 6 of Embodiment 1 only in that a driving ring 120 is provided instead of the driving ring 20. Other components in Embodiment 2 denoted by the same reference numerals as those in Embodiment are basically identical to those in Embodiment 1 (slightly different only in shape), and a description thereof is omitted.

Figure 9:
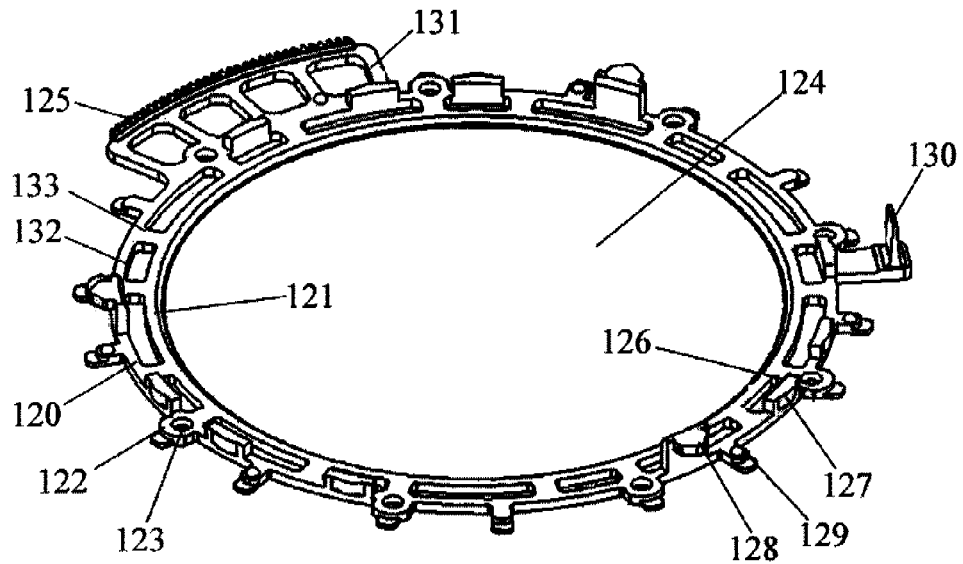
FIG. 9 is a perspective view of a driving ring in the aperture-stop apparatus of Embodiment 2.
Figure 10:
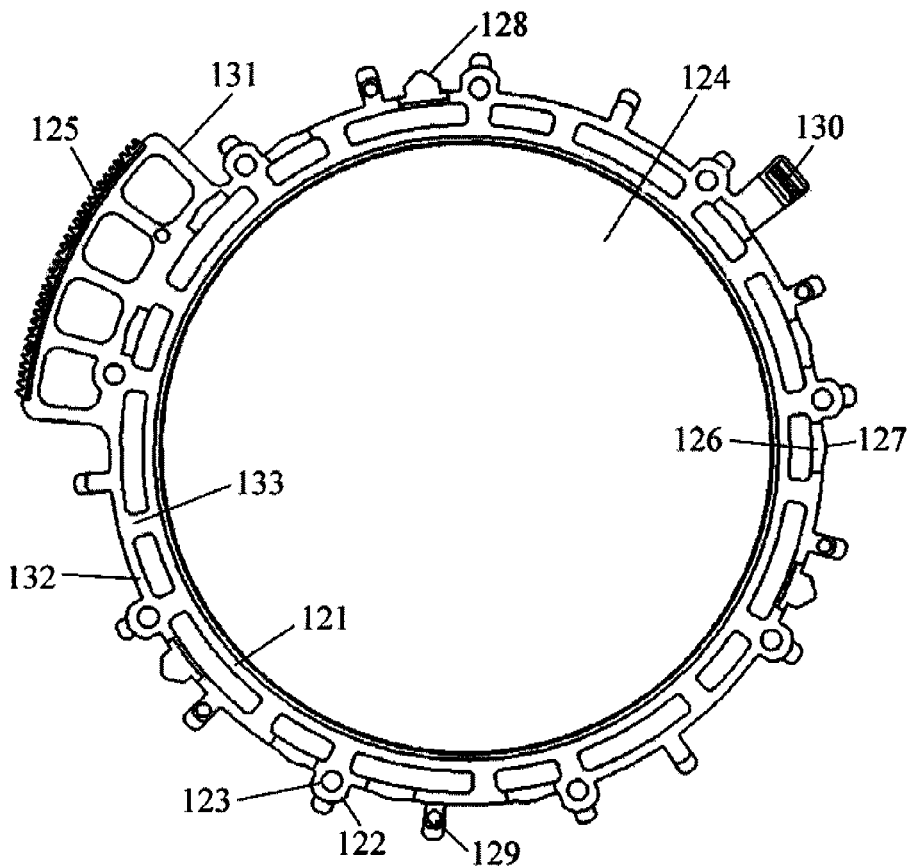
FIG. 10 is a front view of the driving ring in the aperture-stop apparatus of Embodiment 2.

FIG. 9 is an enlarged view of the driving ring 120. The driving ring 120 includes a light-passing aperture 124 formed in its central area, blade-supporting protrusion portions 122 as first blade-supporting portions formed at plural circumferential places (eight places) around the light-passing aperture 124 and a connection portion (ring-shaped portion) 121 formed so as to have a ring shape and circumferentially connect the eight blade-supporting protrusions 122. The connection portion 121 is formed in a multiple ring shape (double ring shape in this embodiment) in which an inner ring part and an outer ring part are divided so as to form a space therebetween. The inner ring part and the outer ring part are integrally connected by ring support portions 133 at plural circumferential places therebetween. The outer ring part of the connection portion 121 is hereinafter referred to as "an outer connection portion 132".

Each blade-supporting protrusion portion 122 is formed so as to protrude outward in the radial direction from the outer connection portion 132. The eight blade-supporting protrusion portions 122 are formed with driving-hole portions 123 into which the driving pins 11 of the eight stop blades 10 are inserted to engage therewith.

Part of an outer circumferential part of the driving ring 120 is formed with a gear portion 125 with which the pinion gear 2 engages. The gear portion 125 includes a gear-teeth portion that circumferentially extends so as to have a circular arc shape and in which plural gear teeth are formed in its outer circumferential part. The gear portion 125 further includes plural gear-support portions (four gear-support portions in this embodiment) 131 extending outward in the radial direction from the outer connection portion 132 to the gear-teeth portion so as to form a space between the gear-teeth portion and the outer connection portion 132.

The outer connection portion 132 is formed with radial supporting-wall portions (rotation supporting portions) 126 each extending toward the retainer plate 40 in the thrust direction from the outer connection portion 132 at plural circumferential places (eight places in this embodiment). Reference numeral 127 denotes contacting-protrusion portions each formed as a convex face on an outer circumferential face of each of the radial supporting-wall portions 126. Contact of the contacting-protrusion portions 127 of the radial supporting-wall portions 126 to the inner circumferential face of the retainer plate 40 engages the driving ring 120 with the inner circumferential face of the retainer plate 40, thereby supporting the driving ring 120 rotatably about the central axis 5.

In addition, a retainer-plate-side part of the outer connection portion 132 of the driving ring 120 is provided with thrust hooks 128 formed at plural circumferential places (three places in this embodiment), and a base-plate-side part (stop blade side part) of the outer connection portion 132 is provided with thrust-retaining protrusions 129 formed at plural circumferential places (six places in this embodiment). The thrust hooks 128 and the thrust-retaining protrusions 129 sandwich the inner circumferential portion (driving-ring supporting portion) 41 of the retainer plate 40 in the thrust direction, thereby causing the retainer plate 40 to support the rotatable driving ring 120 in the thrust direction.

The driving ring 120 is provided with a light-blocking protrusion portion 130 at one circumferential place. The light-blocking protrusion 130 enters between the light-emitting portion and the light-receiving portion of the photo interrupter 3 to block the light emitted from the light-emitting portion from reaching the light-receiving portion.

Figure 15:
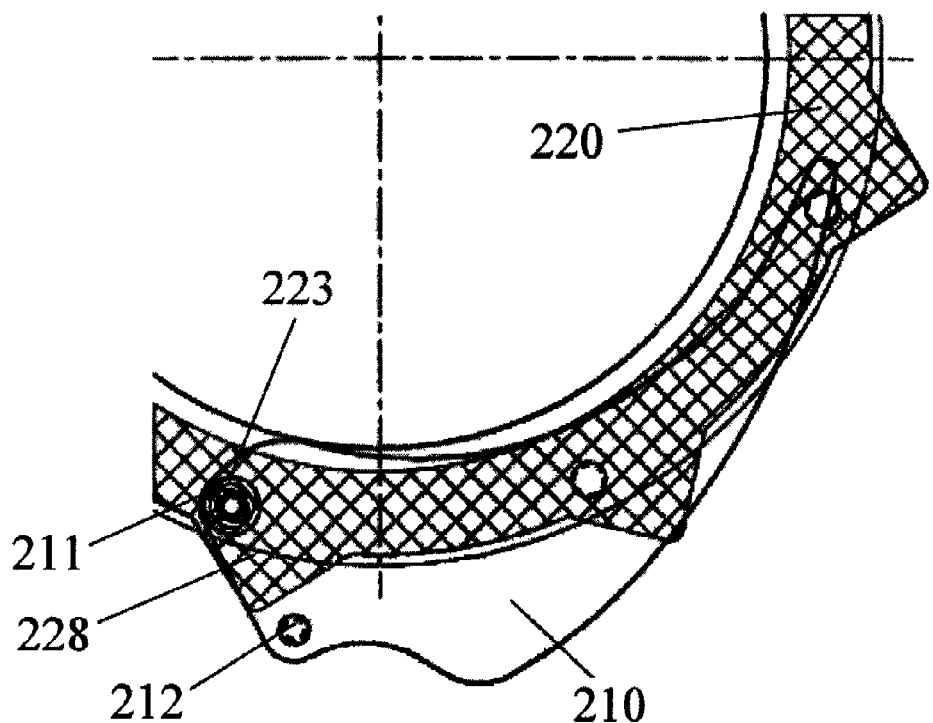
FIG. 15 is a transparent view showing a relationship of the stop blade and a base plate in the conventional aperture-stop apparatus.
Figure 16:
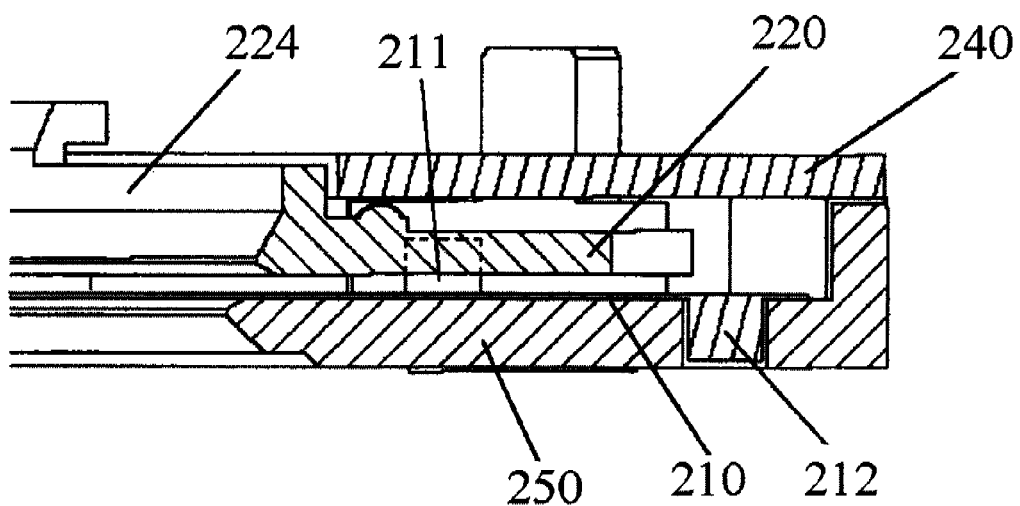
FIG. 16 is a cross-sectional view of the conventional aperture-stop apparatus.

In the aperture-stop apparatus 106 thus configured, forming the driving ring 120 in the multiple ring shape enables reduction of the weight of the driving ring 120, thereby making it possible to reduce the rotation inertia thereof. Therefore, as compared with the driving ring 220 used in the conventional aperture-stop apparatus and not formed in the multiple ring shape as shown in FIG. 15, the driving ring 120 (that is, the stop blades 10) can smoothly rotate, which can improve quick responsiveness of the aperture-stop apparatus 106.

[Embodiment 3]

Figure 11:
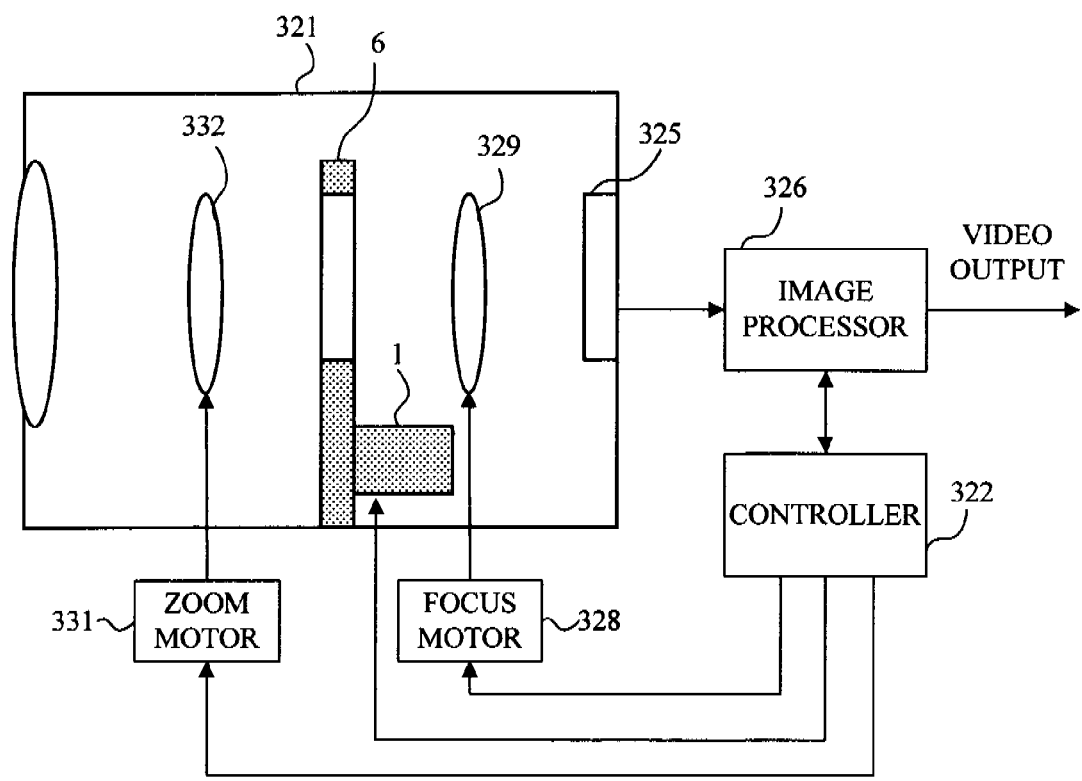
FIG. 11 shows an optical apparatus provided with the aperture-stop apparatus of one of Embodiments 1 and 2.
Figure 12:
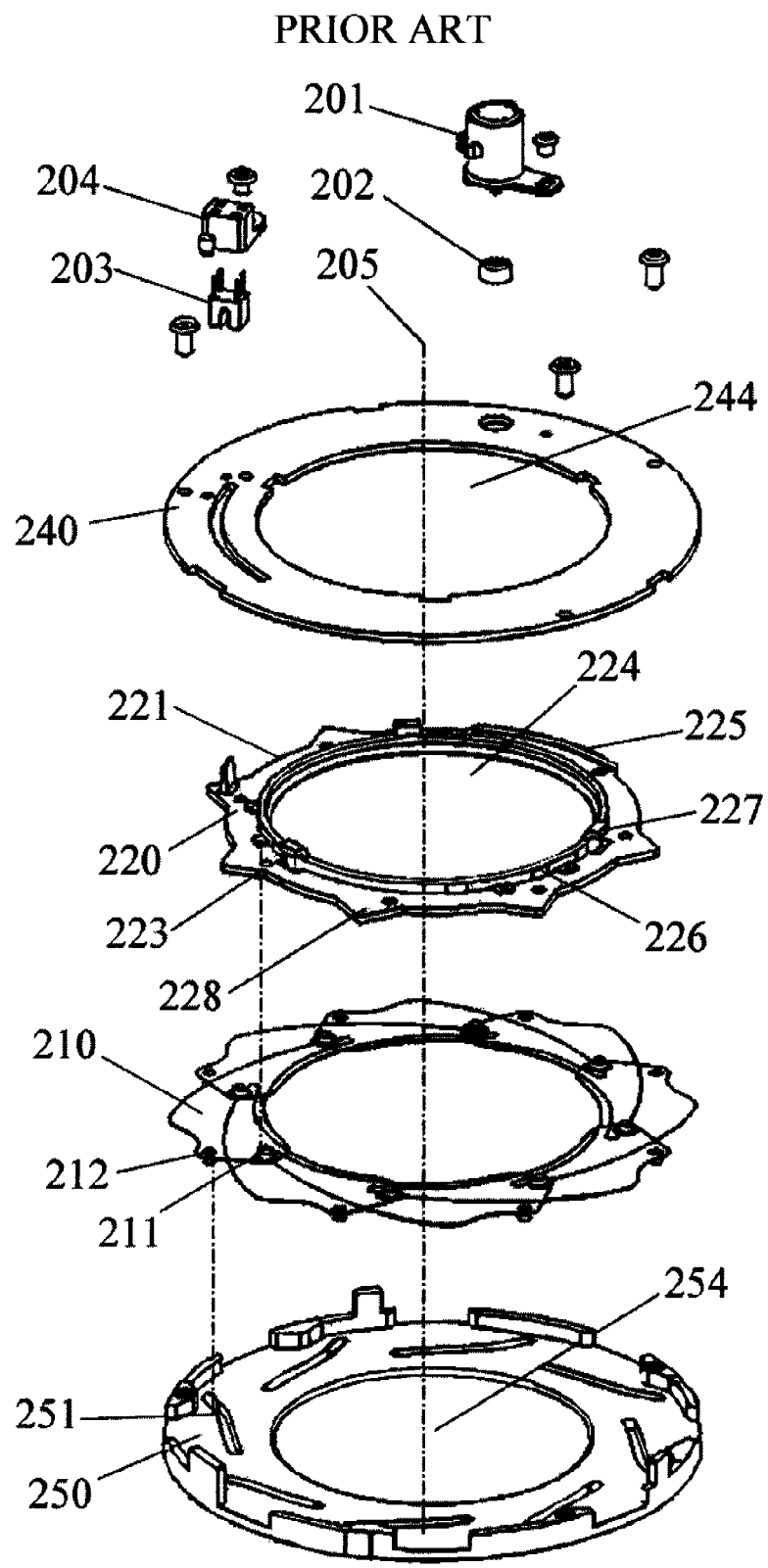
FIG. 12 is an exploded perspective view of a conventional aperture-stop apparatus.
Figure 13:
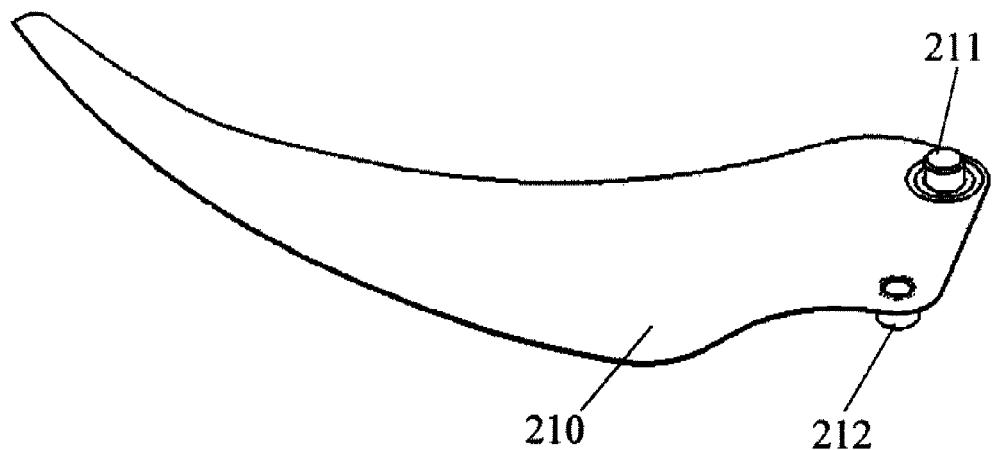
FIG. 13 is a perspective view of a stop blade in the conventional aperture-stop apparatus.
Figure 14:
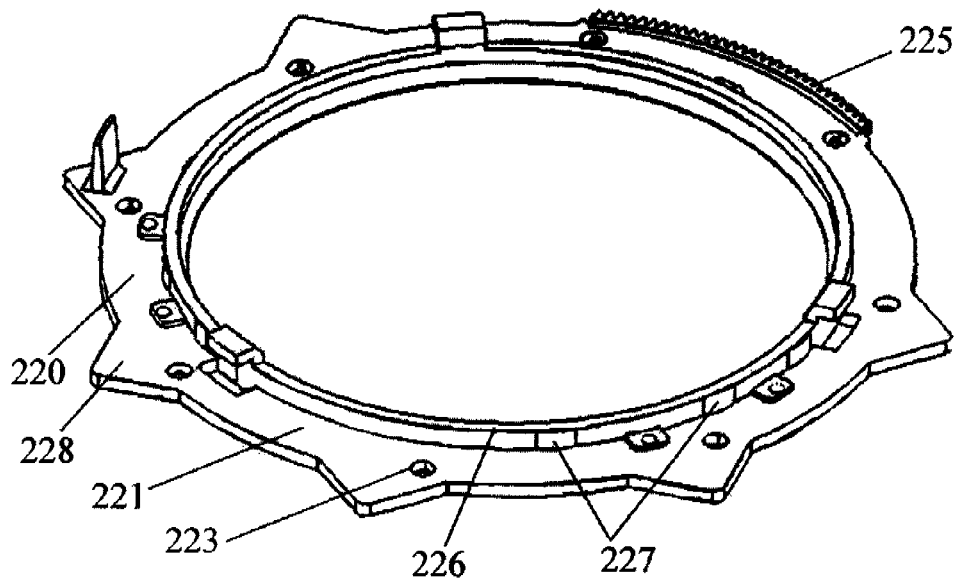
FIG. 14 is a perspective view of a driving ring in the conventional aperture-stop apparatus.

FIG. 11 shows the configuration of a video camera (image pickup apparatus) as an optical apparatus provided with the aperture-stop apparatus described in each of Embodiments 1 and 2.

Reference numeral 321 denotes a lens-barrel unit of the video camera. The lens-barrel unit 321 houses an image-taking optical system including a magnification-varying lens 332, the aperture-stop apparatus 6 of one of Embodiment 1 and 2 and a focus lens 329.

Reference numeral 325 denotes an image sensor constituted by a photoelectric conversion element, such as a CCD sensor or a CMOS sensor. The image sensor 325 photoelectrically converts an object image formed by the image-taking optical system to output electric signals. Changing the aperture diameter of the aperture-stop apparatus 6 can set an appropriate luminance of the object image formed on the image sensor 325 (that is, an appropriate amount of light reaching the image sensor 325).

Reference numeral 326 denotes an image processor performing various image processes on the electric signals output from the image sensor 325 to produce a video signal (video output).

Reference numeral 322 denotes a controller that controls a zoom motor 331 according to a user's operation of a zoom switch (not shown) to move the magnification-varying lens 332 for varying the magnification (zooming). The controller 322 also detects the contrast of the video signal and controls a focus motor 328 according to the detected contrast to move the focus lens 329 for performing auto-focusing.

In addition, the controller 322 controls the actuator 1 of the aperture-stop apparatus 6 (106) based on luminance information included in the video signal to adjust the amount of light, which makes it possible to record a video having an appropriate brightness. Moreover, miniaturization of the aperture-stop apparatus 6 (106) housed in the lens unit enables miniaturization of the lens-barrel unit 321 and the entire video camera.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application Nos. 2010-284308, filed on Dec. 21, 2010, and 2011-274625, filed on Dec. 15, 2011 which are hereby incorporated by reference herein in their entirety.

What is claimed is:

1. A light amount adjustment apparatus comprising:
a base member formed with a fixed aperture through which light passes and plural cam groove portions;
plural light-blocking blades arranged in a circumferential direction of the fixed aperture and forming a variable aperture through which the light passes, each light-blocking blade being provided with a driving pin and a cam pin engaging with one of the cam groove portions;
a driving ring disposed on an opposite side of the light-blocking blades from a base member side of the light-blocking blades and rotating in the circumferential direction of the fixed aperture with respect to the base member to transmit a driving force to the driving pins so as to rotate the light-blocking blades for changing the size of the variable aperture; and
a driving source part rotationally driving the driving ring,
wherein a base-member-side blade face of each of the plural light-blocking blades is supported by the base member,
wherein the driving ring is provided with (a) a ring-shaped portion and (b) first blade supporting portions each formed so as to protrude from the ring-shaped portion outward in a radial direction thereof and each formed with a driving hole portion with which one of the driving pins engages,
wherein the ring-shaped portion is formed in a ring shape so as to connect ends of the plural first blade supporting portions in the circumferential direction, and
wherein each of the plural first blade supporting portions supports an opposite-side blade face of one of plural light-blocking blades on the opposite side from the base-member-side blade face thereof.

2. A light amount adjustment apparatus according to claim 1, further comprising a retaining member, disposed on a side of the light-blocking blades opposite from the base member side of the light-blocking blades and disposed on a side of the driving ring opposite from the base member, fixed to the base member and rotatably supporting the driving ring,
wherein the opposite side blade face of each light-blocking blade is supported by one of the first blade supporting portions and the retaining member.

3. A light amount adjustment apparatus according to claim 1, further comprising a retaining member, disposed on a side of the light-blocking blades opposite to the base member side of the light-blocking blades and disposed on a side of the driving ring opposite from the base member, fixed to the base member and provided with a driving ring supporting portion rotatably supporting the driving ring,
wherein the retaining member is provided with a second blade supporting portion formed so as to protrude closer to the light-blocking blades than the driving ring supporting portion, and
wherein the opposite side blade face of each light-blocking blade is supported by one of the first blade supporting portions and the second blade supporting portion.

4. A light amount adjustment apparatus according to claim 3, wherein the second blade supporting portion supports a portion of the opposite-side blade face of each light-blocking blade opposite from the cam pin.

5. A light amount adjustment apparatus according to claim 3, wherein a driving-ring-supporting-portion-side part of the second blade supporting portion is provided with a slope face whose protruding amount protruding toward the light-blocking blades changes.

6. A light amount adjustment apparatus according to claim 2, wherein the driving ring is provided with rotation supporting portions formed at plural places in the circumferential direction so as to extend toward the retaining member, an outer circumferential face of the rotation supporting portions being formed as a convex face in contact with an inner circumferential face of the retaining member.

7. A light amount adjustment apparatus according to claim 1, wherein the ring-shaped portion of the driving ring is formed in a multiple-ring shape in which at least an inner ring part and an outer ring part are divided so as to form a space therebetween.

8. A light amount adjustment apparatus according to claim 1,
wherein the driving ring is provided with a gear portion to which the driving force from the driving source part is transmitted,
wherein the gear portion includes (a) a gear teeth portion where plural gear teeth are formed and (b) a gear support portion that extends from the ring-shaped portion outward in the radial direction to the gear teeth portion so as to form a space between the ring-shaped portion and the gear teeth portion.

9. A light amount adjustment apparatus according to claim 8, wherein the gear support portion also serves as one of the first blade supporting portions.

10. An optical apparatus comprising:
a body of the optical apparatus; and
a light amount adjustment apparatus, according to claim 1, housed in the body.

11. A light amount adjustment apparatus comprising:
a base member formed with a fixed aperture through which light passes and plural cam groove portions;
plural light-blocking blades arranged in a circumferential direction of the fixed aperture and forming a variable aperture through which the light passes, each light-blocking blade being provided with a driving pin and a cam pin engaging one of the cam groove portions;
a driving ring disposed on an opposite side of the light-blocking blades from a base member side of the light-blocking blades and rotating in the circumferential direction of the fixed aperture with respect to the base member to transmit a driving force to the driving pins so as to rotate the light-blocking blades for changing the size of the variable aperture; and
a driving source part rotationally driving the driving ring,
wherein a base-member-side blade face of each of the plural light-blocking blades is supported by the base member,
wherein the driving ring is provided with:
plural first blade supporting portions each formed with a driving hole portion with which one of the driving pins engages;
a multiple ring-shaped portion connecting the plural first blade supporting portions in the circumferential direction and including an inner ring part and an outer ring part formed so as to form a space therebetween; and
ring support portions integrally connecting the inner ring part and the outer ring part at plural places in the circumferential direction.

12. An optical apparatus comprising:
a body of the optical apparatus; and
a light amount adjustment apparatus, according to claim 11, housed in the body.

* * * * *